United States Patent [19]

Horsley

[11] 3,772,157
[45] Nov. 13, 1973

[54] PURIFICATION OF 2-CHLOROALKANOIC ACIDS BY AZEOTROPIC DISTILLATION
[75] Inventor: Lee H. Horsley, Midland, Mich.
[73] Assignee: The Dow Chemical Company, Midland, Mich.
[22] Filed: Dec. 10, 1971
[21] Appl. No.: 206,861

[52] U.S. Cl.............. 203/52, 203/63, 203/67, 203/68, 203/69, 203/70, 203/56, 203/82, 260/539 R, 260/539 A
[51] Int. Cl..... C07c 53/16, B01d 3/36, C07c 53/32
[58] Field of Search .................. 203/63, 67, 68, 69, 203/70, 56, 52, 82; 260/539 A, 539 R

[56] References Cited
UNITED STATES PATENTS
2,809,214  10/1957  Haimsohn .................. 260/539 A
2,790,828  4/1957   Haimsohn .................. 260/539 A OTHER PUBLICATIONS
Horsley, L. H.: Azeotropic Data, American Chemical Society, 1952, Wash., D.C., pg. 38, 40, 41.

Technique of Organic Chemistry, Vol. IV, (1951) Distillation: Weissberger, Interscience Publ., N.Y., pg. 356-371.

Primary Examiner—Wilbur L. Bascomb, Jr.
Attorney—William M. Yates et al.

[57] ABSTRACT

Monochloroacetic acid can be separated efficiently from dichloroacetic acid and 2-chloropropionic acid can be separated from 2,2-dichloropropionic acid by adding an azeotrope-forming agent to such a mixture and distilling off the monochloro acid azeotrope. Azeotrope formers have a boiling point of about 145°–240°C and are hydrocarbons, halogenated hydrocarbons, and ethers.

11 Claims, No Drawings

PURIFICATION OF 2-CHLOROALKANOIC ACIDS BY AZEOTROPIC DISTILLATION

BACKGROUND OF THE INVENTION

This invention relates to a new chemical process and it concerns particularly a process for separating chloroacetic acid and 2-chloropropionic acid from their mixtures with the corresponding dichlorinated acids by azeotropic distillation.

The chlorinated lower aliphatic acids are made by well known direct chlorination processes which yield as the crude product, the desired chlorinated acid mixed with small but appreciable quantities of under-chlorinated material and the over-chlorinated compound, depending upon the degree of chlorination. In the chlorination of propionic acid to make 2,2-dichloropropionic acid, an effective grass-killer, for example, the product is contaminated with a significant amount of the monochloro acid. Since these two acids have very close boiling points, purification by simple distillation is impossible and an expensive recrystallization procedure must be resorted to if a pure product is desired.

Similarly, when acetic acid is chlorinated to make monochloroacetic acid, a useful intermediate in the production of glycine, 2,4-dichlorophenoxyacetic acid, and other such compounds, a significant amount of dichloroacetic acid is also formed. Since the monochloro and dichloro acids have boiling points only 5° apart, a simple distillation will not provide enough separation and recrystallization is necessary to obtain a purified product. Substantial underchlorination will essentially eliminate the dichlorinated product, but this procedure involves the distillation of an economically impractical amount of unreacted acetic acid.

It is known that chloroacetic acid forms lower boiling azeotropes with a number of dissimilar kinds of compounds such as o-bromotoluene, decane, cymene, and others. It is also known that dichloroacetic acid forms lower boiling azeotropes with some of the same compounds and would generally be expected to form azeotropes with the others. Such, in fact, has been found to be the case. The same situation exists with 2-chloropropionic acid and 2,2-dichloropropionic acid. In both cases, the respective azeotropes have about as close boiling points as do the monochloro and dichloro acids themselves. Therefore, azeotropic distillation appears to offer no better chance for effective separation of these acids than distillation of the mixed acids alone.

SUMMARY OF THE INVENTION

It has now been found quite unexpectedly that both chloroacetic acid and 2-chloropropionic acid can be separated efficiently from their mixtures with the corresponding dichlorinated acids by adding to those mixtures an azeotrope-forming compound and distilling its azeotrope with the monochloro acid from the resulting mixtures. Operable azeotrope-forming compounds have a boiling point at atmospheric pressure of about 145°–240°C, preferably about 170°–220°C, and are hydrocarbons, halogenated hydrocarbons, and hydrocarbon ethers. A mixture of related compounds such as a saturated aliphatic hydrocarbon fraction having a boiling range of about 170°–220°C is a preferred example.

DETAILED DESCRIPTION

The quantity of azeotrope-forming compound added to the chlorinated acid mixture is not a critical factor, for any significant amount will distill from the mixture as its azeotrope with the monochloro acid and so effect a separation to the extent that it is present. Preferably, enough azeotrope-former is used to separate essentially all of the monochloro acid. A smaller amount will result in incomplete recovery of the monochloro acid while an excess requires unnecessary distillation to remove it.

The distillation pressure is also not a critical condition. Preferably, the distillation is run at a pressure between about 10 mm. Hg and atmospheric pressure for reasons of distillate condensation efficiency at lower pressures and increasing corrosion of equipment and thermal decomposition of products at higher pressures. The distillation pressure is advantageously varied according to the particular system involved, since the concentration of monochloro acid in the azeotrope increases somewhat with increasing pressure.

The classes of azeotrope-forming compounds suitable for use in this process can be divided into a number of groups and subgroups. Thus, aliphatic, cycloaliphatic, and aromatic hydrocarbons having normal boiling points within the defined range are operable. The aliphatic hydrocarbons can be defined further as saturated, olefinic, and acetylenic aliphatic hydrocarbons. These can be branched or straight chain compounds. Examples of these various groups are decane, undecane, tridecane, dodecene, tetradecene, undecyne, isopropylcyclohexane, cyclooctane, dicyclopentane, cymene, butylbenzene, naphthalene, and decahydronaphthalene. For obvious reasons, inert, normally liquid hydrocarbons are preferred and hydrocarbons containing no aliphatic unsaturation are more desirable than their unsaturated analogs.

Similarly, the class of halogenated hydrocarbons includes halogenated aliphatic hydrocarbons, halogenated cycloaliphatic hydrocarbons, and halogenated aromatic hydrocarbons. In the same way, the halogen atom or atoms present can be one or more of the common halogens, fluorine, bromine, chlorine, and iodine. Some examples of this class are bromobenzene, o-dichlorobenzene, benzyl chloride, difluorotetrabromoethane, and tetrachloroethane.

The class of hydrocarbon ethers includes dialkyl ethers and alkyl aryl ethers, these being the only commonly available ethers within the specified boilng point range. Examples are diamyl ether, phenetole, dimethoxybenzene, ethyl octyl ether, anisole, and other such ethers.

Of particular interest and advantage in the present process are the saturated aliphatic hydrocarbons. These are not only stable and unreactive compounds, but they also have the property of mutual insolubility with the monochloro acids at ambient and moderate temperatures so that the distilled and condensed azeotrope separates into two liquid phases, thereby greatly facilitating the separation of the pure monochloro acid. A particularly useful and readily available member of this class is a paraffinic hydrocarbon fraction having a boiling range of approximately 170°–220°C and consisting essentially of decanes, undecanes, dodecanes, and tridecanes. The azeotropes of other compounds listed above can be conveniently separated by addition of water, whereupon an aqueous monochloro acid phase separates, or, in the case of chloroacetic acid, sufficient cooling of the azeotrope will cause the separation of the solid acid.

This process can be operated either as a batch process or continuously. In the batchwise operation of the preferred separation of monochloroacetic acid from dichloroacetic acid using an aliphatic hydrocarbon such as undecane, for example, the distilled azeotrope separates into two layers and the heavy chloroacetic acid layer is drawn off for a finishing distillation to remove any remaining undecane or traces of acetic acid if present. The condenser and separator are maintained at about 60° slighty above to keep the chloroacetic acid layer from solidifying. The light, undecane layer is returned to the still if more is needed. When all of the chloroacetic acid has been separated, the light layer is withdrawn until all undecane is removed from the still pot, leaving dichloroacetic acid as the residue.

Continuous operation is preferred for commercial practice. In this type of operation, using the system above, the chloroacetic acid — dichloroacetic acid mixture plus undecane can be fed into a fractional distillation column at about its midpoint and the chloroacetic acid — undecane azeotrope distillate is condensed as a two phase liquid into a heated liquid separator from which most of the heavy layer passes to a finishing column for removal of remaining undecane and any acetic acid present. Pure chloroacetic acid is drawn off from the bottom of the finishing column. Some of the heavy layer in the separator is fed as needed into the top of the main distillation column as reflux. The light (undecane) layer from the separator plus undecane from the finishing column is also fed into the top of the main column while pure dichloroacetic acid is drawn off from the bottom of the main column, conditions in this column being maintained such that the undecane inventory remains principally in the upper part. When equilibrium has been established, only small amounts of undecane need be added to the mixed chlorinate acid feed from time to time as makeup to replace mechanical losses. The system thus operates with an essentially constant inventory of undecane while the effluent products are substantially pure chloroacetic acid and substantially pure dichloroacetic acid, any trichloroacetic acid remaining with the latter product. Buildup of lights such as acetic acid in such a system can be avoided by any of several expedients, for example, by preliminary stripping of the chlorinated acetic acid feed, by stripping a side stream of undecane taken from the return stream from the finishing column, or by taking off acetic acid at the top of the finishing column and drawing off the undecane return stream from a point below the top of that column.

Table 1 lists the boiling points and compositions at various absolute pressures for some of the preferred azeotropic systems discussed above. The figures can be used as a guide to operating conditions for either batchwise or continuous operation of the separation process. These data were determined by distilling small samples for analysis from the various mixtures.

TABLE 1

| Chlorinated acid | Azeotropic agent | Azeotrope Pressure, mm. Hg | B.p., °C | Weight percent acid |
|---|---|---|---|---|
| Chloroacetic acid | n-Decane | 40 | 82 | 20 |
| Do | do | 60 | 90 | 21 |
| Do | do | 100 | 102 | 23 |
| Do | do | 200 | 118 | 25 |
| Do | do | 300 | 130 | 26 |
| Do | do | 744 | 158 | 34 |
| Do | n-Undecane | 50 | 98 | 35 |
| Do | do | 100 | 112 | 38 |
| Do | do | 200 | 130 | 40 |
| Do | do | 745 | 169 | 46 |
| Do | n-Dodecane | 100 | 120 | 48.5 |
| Do | n-Tridecane | 100 | [1] 125 | [1] 60.7 |
| Dichloroacetic acid | n-Undecane | 50 | 102 | 36 |
| Do | do | 100 | 117 | 40 |
| Do | n-Dodecane | 100 | 125 | 55 |
| Do | n-Tridecane | 100 | 129 | 72 |
| 2-chloropropionic acid | n-Decane | 100 | 103 | 22 |
| 2,2-dichloropropionic acid | do | 100 | 106 | 13 |

[1] Value calculated from vapor pressure-temperature curve.

Saturated aliphatic hydrocarbons are preferred azeotropic agents because they are immiscible with the monochlorinated acids and this makes possible an easy separation of azeotropic agent from the chlorinated acid in a two phase distillate. The approximate critical solution temperatures of some of these systems are listed in Table 2. Equal volumes of the two components were used in these determinations.

TABLE 2

| System | Solution Temperature, °C |
|---|---|
| n-Undecane-Chloroacetic Acid | 169 |
| n-Dodecane-Chloroacetic Acid | 175 |
| n-Undecane-Dichloroacetic Acid | 24 |
| n-Dodecane-Dichloroacetic Acid | 35 |

EXAMPLES 1-9

The efficiency of various azeotropic agents was determined by distilling a small sample from monochloroacetic acid containing a minor proportion of a dichloroacetic acid, then adding azeotropic agent to the distillation flask and distilling a second sample. Analysis of the two distillate samples and the still residue showed the measure of improvement in separation afforded by the particular azeotropic agent. A ½ inch by 12 inch Vigreux column was used for these distillations which were run under reduced pressure. Analysis was by vapor phase chromatography. The results obtained are listed in Table 3. Each group of experiments was run using the same monochloroacetic — dichloroacetic acid mixture. The variations in residue analysis within each group indicate experimental variation in analyses.

TABLE 3

| Azeotropic agent | Pressure, mm. Hg | Wt. percent dichloroacetic acid [1] Distillate | Residue |
|---|---|---|---|
| None | 28 | 1.4 | 2.3 |
| n-Decane | 100 | 0.3 | 2.3 |
| Do | 105 | 0.26 | 2.3 |
| None | 30 | 2.3 | 4.1 |
| Cumene | 150 | <0.3 | 3.7 |
| Diethylbenzene | 60 | 0.5 | 3.9 |
| sym-Tetrachloroethane | 150 | 0.95 | 3.9 |
| Bromobenzene | 110 | Trace | 3.3 |
| o-Dichlorobenzene | 70 | 0.8 | 5.0 |
| Isopropylcyclohexane | 150 | Trace | |
| 1-decene | 110 | Trace | |
| None | 100 | 5.5 | 6.6 |
| Phenetole | 100 | 1.1 | 6.6 |

[1] Based on the chlorinated acetic acid content.

EXAMPLES 10-11

The procedure of Examples 1-9 was repeated using mixtures of 2-chloropropionic acid with 2,2-dichloropropionic acid. These results are listed in Table 4.

TABLE 4

| Azeotropic Agent | Pressure mm. Hg | Wt. % Dichloro Acid* Distillate | Residue |
|---|---|---|---|
| None | 100 | 50.5 | 57.8 |
| n-Undecane | 100 | 43.5 | 57.8 |

| | | | |
|---|---|---|---|
| None | 100 | 9.6 | 13.4 |
| n-Decane | 100 | 4.4 | 14.6 L6 * based on the chlorinated propionic acid content |

When the procedure of Examples 1, 10 and 11 is repeated using dodecane, tridecane, or a paraffinic hydrocarbon fraction boiling in the approximate range of 170°–220°C in place of decane or undecane as the azeotrope-forming agent, closely similar results are obtained. Such a fraction, which may be designated as kerosene or fuel oil no. 1, consists essentially of a mixture of saturated aliphatic hydrocarbons in the $C_{10}$–$C_{13}$ range, but under the conditions of the process, no significant amount of fractionation of the individual hydrocarbons takes place during the distillation steps and the hydrocarbon fraction behaves substantially as if it were a single hydrocarbon compound.

I claim:

1. A process for separating a 2-chloroalkanoic acid of 2–3 carbon atoms from its mixture with the corresponding 2,2-dichloroalkanoic acid which comprises adding to said mixture an azeotrope-forming agent and distilling 2-chloroalkanoic acid — azeotropic agent as the azeotrope from the resulting mixture, wherein said agent has a boiling point at atmospheric pressure of about 145°–240°C and is a hydrocarbon, a halogenated hydrocarbon, a dialkyl ether, an alkyl aryl hydrocarbon ether, or a mixture thereof.

2. The process of claim 1 wherein the azeotrope-forming agent is a saturated aliphatic hydrocarbon.

3. The process of claim 2 wherein the saturated hydrocarbon is undecane.

4. The process of claim 2 wherein the saturated hydrocarbon is dodecane.

5. The process of claim 2 wherein the saturated hydrocarbon is a saturated hydrocarbon fraction having a boiling range of about 170°–220°C.

6. The process of claim 2 wherein the 2-chloroalkanoic acid is chloroacetic acid.

7. The process of claim 2 wherein the 2-chloroalkanoic acid is 2-chloropropionic acid.

8. A continuous process for separating chloroacetic acid from its mixture with dichloroacetic acid which comprises continuously introducing said mixture and saturated aliphatic hydrocarbon having a normal boiling point of about 170°–220°C into a first fractional distillation column, continuously removing therefrom a first distillate fraction and a first residue fraction, said first distillate fraction consisting of an upper liquid layer which is essentially the saturated hydrocarbon and a lower liquid layer which is substantially chloroacetic acid, said first residue consisting essentially of dichoroacetic acid, continuously withdrawing said first residue, continuously returning said upper liquid layer and a minor proportion of said lower liquid layer to the first distillation column, continuously introducing the major proportion of the lower liquid layer into a second fractional distillation column, continuously removing from said second column a second distillate which is essentially saturated hydrocarbon-chloroacetic acid azeotrope and a second residue which is purified chloroacetic acid, and returning said second distillate to said first column.

9. The process of claim 8 wherein the saturated hydrocarbon is undecane.

10. The process of claim 8 wherein the saturated hydrocarbon is dodecane.

11. The process of claim 8 wherein the saturated hydrocarbon is a saturated hydrocarbon fraction having a boiling range of about 170°–220°C.

* * * * *